United States Patent [19]

Ishii et al.

[11] Patent Number: 5,043,498

[45] Date of Patent: Aug. 27, 1991

[54] PROCESS FOR THE HYDROGENATION OF CONJUGATED DIENE POLYMERS HAVING ALCOHOLIC HYDROXYL GROUPS

[75] Inventors: Masao Ishii; Hideo Takamatsu; Kazushige Ishiura; Shobu Minatono, all of Kashima, Japan

[73] Assignee: Kuraray Company Ltd., Kurashiki, Japan

[21] Appl. No.: 281,038

[22] Filed: Dec. 7, 1988

[30] Foreign Application Priority Data

Dec. 7, 1987 [JP] Japan .................. 62-309994
Aug. 23, 1988 [JP] Japan .................. 63-210112

[51] Int. Cl.$^5$ ................................. C07C 5/03
[52] U.S. Cl. ...................... 585/276; 585/255; 585/274; 525/338; 525/339
[58] Field of Search ............ 585/274, 276, 255; 525/338, 339

[56] References Cited

U.S. PATENT DOCUMENTS

| | | | |
|---|---|---|---|
| 2,864,809 | 12/1958 | Jones et al. | |
| 4,060,492 | 11/1977 | Yasui et al. | 585/276 |
| 4,656,230 | 4/1987 | Skyr et al. | 525/339 |

FOREIGN PATENT DOCUMENTS

| | | | |
|---|---|---|---|
| 0319967 | 6/1989 | European Pat. Off. | 525/339 |
| 2254586 | 7/1975 | France . | |
| 2151404 | 7/1987 | Japan | 525/339 |
| 2151405 | 7/1987 | Japan | 525/339 |
| 727578 | 4/1955 | United Kingdom . | |

*Primary Examiner*—Asok Pal
*Attorney, Agent, or Firm*—Oblon, Spivak, McClelland, Maier & Neustadt

[57] ABSTRACT

A process for the hydrogenation of conjugated diene polymers having alcoholic hydroxyl groups, is provided. In the process, reduced nickel is used as a catalyst and an ether or a mixture of an ether and a hydrocarbon is used as a solvent for the hydrogenation reaction whereby elimination of the group rarely occurs with a very high hydrogenation rate being attained.

6 Claims, No Drawings
}

PROCESS FOR THE HYDROGENATION OF CONJUGATED DIENE POLYMERS HAVING ALCOHOLIC HYDROXYL GROUPS

BACKGROUND OF THE INVENTION

1. Field of the Invention

This invention relates to a process for hydrogenating conjugated diene polymers having hydroxyl or carboxyl groups, or groups derived from the carboxyl group at high hydrogenation rates without damaging the groups present in the conjugated diene polymers.

2. Description of the Related Art

Among conjugated diene polymers having hydroxyl or carboxyl groups, or groups derived from the carboxyl group (which polymer may be hereinafter referred to simply as "modified polymer" and which group may be referred to simply as "substituent"), conjugated diene polymers having a substituent at one or both ends are useful for reacting with diisocyanate compounds to form moldings with a high resistance to hydrolysis. Alternatively, conjugated diene polymers having substituents in the molecular chain exhibit good rubber elasticity and can be cured by means of sulfur or peroxides. Moreover, the polymers may undergo various modifications depending upon the type of functional group in the polymers. As will be appreciated from the above, it is known that a variety of functions can be imparted to the conjugated diene polymers by introducing certain functional groups into the polymers. The carbon-carbon double bond in the conjugated diene polymer serves as an important reaction site when the functional groups are introduced into the polymer, but will cause the weatherability, light resistance and heat resistance of the resultant modified polymer to lower. In order to improve the weatherability, light resistance and heat resistance, it is considered to hydrogenate the carbon-carbon double bond in the presence of a catalyst.

Known catalysts for the hydrogenation used for the hydrogenation reaction of the carbon-carbon double bond are those of nickel, palladium, ruthenium and the like (Japanese Laid-open Patent Application Nos. 50—90694 and 52—111992 and United States Patent No. 4107225). However, when modified polymers are hydrogenated by the use of these catalysts, there are encountered problems in that the hydrogenation reaction does not proceed at all by the presence of the substituents, the hydrogenation rate lowers considerably, or the chemical structure of the substituent changes or the substituent is eliminated from the modified polymer. Since the palladium or ruthenium catalyst is expensive, its application to the hydrogenation reaction of modified polymers brings about an increase of production costs, thus being disadvantageous from the industrial viewpoint.

An object of the present invention is to provide a process for the hydrogenation of modified polymers which solve the prior-art problems.

Another object of the invention is to provide a process for the hydrogenation of modified polymers which has a high hydrogenation rate and in which substituents present in the modified polymers are not damaged.

Other objects, features and advantages of the invention will become apparent from the following description.

SUMMARY OF THE INVENTION

The present inventors made intensive studies on a process for the hydrogenation of conjugated diene polymers (modified polymers) having alcoholic hydroxyl or carboxyl groups or groups derived from the carboxyl group (substituents), in which the hydrogenation reaction was carried out at a high hydrogenation rate without causing any chemical change or elimination of the substituents. As a result, it was found that when a so-called reduced nickel catalyst was used and a solvent used for the hydrogenation was an ether or a mixed solvent of an ether and a hydrocarbon, the hydrogenation velocity became high with a high hydrogenation rate and the elimination of the substituents was not brought about. The present invention is accomplished based on the above finding.

A prominent feature of the invention resides in the hydrogenation of modified polymers in which a reduced nickel catalyst is used and a solvent for the hydrogenation is an ether or a mixture of an ether and a hydrocarbon.

DESCRIPTION OF THE PREFERRED EMBODIMENTS

The modified polymers to which the hydrogenation process of the invention is applied are conjugated diene polymers having substituents in the molecule. Examples of the modified polymers include those polymers obtained by polymerizing monomers, such as 1,3-butadiene, 1,3-pentadiene, isoprene, 2,3-dimethylbutadiene, phenylbutadiene and the like, by various known processes. The polymers may be not only homopolymers of the conjugated diene monomers indicated above, but also copolymers of two or more of conjugated diene monomers and copolymers of the conjugated diene monomers and vinyl monomers. For the copolymerization of two or more of the conjugated diene monomers, the ratio of these monomer ingredients may be arbitrary without limitation. Examples of the vinyl comonomers include styrene, vinyltoluene, alpha-methylstyrene, vinylnaphthalene, cumarone, indene, vinylpyridine, vinylfuran, acrylonitrile, ethyl acrylate, methyl acrylate, methyl methacrylate, hydroxyethyl acrylate, hydroxyethyl methacrylate, acrylic acid, methacrylic acid and the like. These comonomers are used in an amount of not larger than 95 wt%, preferably not larger than 80 wt%, of the total monomer.

As the number of substituents contained in the modified polymer increases, the substituents are more likely to eliminate by the hydrogenation reaction with a higher degree of deactivation of the hydrogenation catalyst. The number of the substituents is preferably from 1 to 100 in one molecule of the polymer.

In the practice of the invention, the groups derived from the carboxyl group include an acid anhydride group, an imido group, an amido group, an ester group, a haloacyl group, a metal salt or ammonium salt of a carboxyl group, and the like.

Although the process of the invention can be applied irrespective of the number average molecular weight (Mn) of modified polymers, the number average molecular weight is preferably in the range of from 500 to 200,000. In view of the case where conjugated diene polymers having a substituent at ends thereof are used, for example, as a starting material for moldings, a preferred number average molecular weight is in the range of from 500 to 50,000, more preferably from 700 to 30,000. Oligomers having a molecular weight of not larger than 500 are disadvantageous in that moldings obtained from the oligomers after hydrogenation are deficient in flexibility. Moreover, the hydrogenated products of conjugated diene polymers having a substituent at ends thereof and a molecular weight of not less than 50,000 are also disadvantageous in that the resultant molding has small physical strength and the hydrogenated products are poor in moldability.

In consideration of the case where hydrogenated products of conjugated diene polymers having substituents in the molecule are formulated, for example, as a modifier for plastics, a preferred number average molecular weight of the modified polymer is in the range of from 5,000 to 200,000, more preferably from 10,000 to 150,000. When the molecular weight is less than the above range, polyolefin compositions to which the hydrogenated product of a modified polymer is added as a modifier for plastics involve problems that the mechanical strength is liable to lower or the hydrogenated product is apt to bleed on the surfaces of a molding during storage over a long time. On the other hand, when the molecular weight is over the above range, not only flexibility is not imparted to polyolefin compositions, but also an effect of improving coating properties is unfavorably small. By blending with a compound having a favorable range of molecular weight, the melt viscosity during the course of melting and kneading lowers with improved workability.

The number average molecular weight used herein is a number average molecular weight calculated as styrene from a gel permeation chromatography (GPC).

Among modified polymers used in the present invention, conjugated diene polymers having a substituent at ends thereof can be obtained by various processes. For instance, one or more of conjugated diene monomers or a mixture of a conjugated diene monomer and a vinyl monomer may be radical-polymerized in the presence of a catalyst including an azobis compound having a functional group, e.g. $\beta\beta'$-azobis($\beta$-cyano)-n-propanol, $\delta,\delta'$-azobis($\delta$-cyano)-n-pentanol, 4,4'-azobis(4-cyanopentanoic acid), dimethyl-2,2'-azobis(2-methylpropionic acid), 2,2'-azobis(2-methylpropionamido)-dihydrate or the like, or a peroxide such as hydrogen peroxide, cyclohexane peroxide, methylcyclohexanone peroxide or the like. An experimental procedure of the polymerization using isoprene as the monomer is particularly described below. 300 g of hexane as a solvent, 68 g of isoprene as a monomer and 44 g of cyclohexanone peroxide as a catalyst [having a chemical formula,

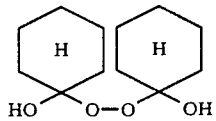

commercial name, Perhexa H 50% Product (Nippon Oils and Fats Co., Ltd.)]are charged into a one liter autoclave and heated to 80° C. while agitating for polymerization over 20 hours to obtain hydroxyl group-containing polyisoprene (yield 65%, Mn =5,500, OH value 21 mg/g).

The conjugated diene polymers having a substituent at ends thereof may be prepared by polymerizing the above-mentioned monomers or monomer mixture in the presence of a catalyst made of an alkali metal such as sodium, lithium or the like, and adding an alkylene oxide, epichlorohydrin or the like to the polymerization system to introduce hydroxyl groups into the polymer.

The conjugated diene polymers having substituents in the molecular chain may also be obtained by various processes. For instance, there is a process in which a polymer having carbon-carbon double bonds is obtained by polymerization and substituents are added to the polymer by polymerization reaction. More particularly, one or more of conjugated diene monomers or a mixture of a conjugated diene monomer and a vinyl monomer is polymerized by ordinary polymerization procedures such as anion polymerization, radical polymerization and the like to obtain a polymer. The thus obtained polymer is subsequently subjected to a process as described, for example, in Japanese Laid-open Patent Application No. 55—133403 or 57—16003, in which maleic anhydride is added to the conjugated diene polymer.

Alternatively, another process may be used in which a conjugated diene monomer and a monomer having a substituent are copolymerized. More specifically, one or more of conjugated diene monomers or a mixture of a conjugated diene monomer and a vinyl monomer and a monomer having a substituent are subjected to ordinary polymerization such as anion polymerization, radical polymerization or the like. The monomers having a carboxyl group include, for example, acrylic acids such as acrylic acid, methacrylic acid, crotonic acid, isocrotonic acid, oleic acid, fumaric acid, maleic acid, itaconic acid and the like. The monomers having an acid anhydride group include acid anhydrides such as maleic anhydride, itaconic anhydride and the like. The monomers having an imido group include maleimides such as N-phenylmaleimide, N-(p-chlorophenyl)maleimide and the like. The monomers having an amido group include acrylamide, methacrylamide and the like. The monomers having an ester group are alkyl or aryl esters of the above-indicated carboxylic acids and carboxylic anhydrides. Additionally, the monomers having a haloacyl group include acryloyl chloride, methacryloyl chloride, maloyl dichloride and the like.

When the modified polymers obtained by these processes are hydrogenated by using reduced nickel as a catalyst and an ether solvent or a mixed solvent of an ether solvent and a hydrocarbon solvent, the hydrogenation proceeds efficiently and readily without elimination of any substituents.

The reduced nickel catalyst used in the present invention can be obtained according to known procedures in which nickel oxide, nickel hydroxide or basic nickel carbonate is heated for reduction in a stream of hydrogen. The reduced nickel catalyst is usually employed as supported on a carrier such as carbon, alumina, silica, diatomaceous earth or the like. The reduced nickel catalyst may be a carrier on which 2 to 30 wt% of a co-catalyst such as of zirconium, an alkali metal or an alkaline earth metal and the balance of nickel have been supported. The nickel should be supported in an amount of from 20 to 60 wt%, preferably from 30 to 50 wt%. Reduced nickel catalysts which surfaces are partially oxidized, are commercially sold, for example, under the designations of SN-100, SN-150 and SN-300 available from Sakai Chemical Industry Co., Ltd. Since these catalysts have good stability, their use is recommended.

Aside from the reduced nickel catalyst, there are known, as the hydrogenation catalyst used for the hydrogenation reaction, a Raney nickel catalyst as a nickel catalyst and a palladium catalyst. However, the Raney nickel catalyst is liable to ignite in air, with the difficulty that close attention is required in handling. In addition, when the Raney nickel catalyst is used for hydrogenation of modified polymers in an ether solvent, a high hydrogenation rate cannot be attained as is particularly shown in Comparative Examples 2, 5 and 9. On the other hand, when hydrogenation of modified polymers in an ether is effected using a palladium catalyst, elimination of substituents is considerable as is particularly shown in Comparative Examples 7 and 11.

The ethers used in the present invention as a solvent include linear ethers such as ethyl ether, n-butyl ether, isopropyl ether, diisoamyl ether and the like, phenol ethers such as phenyl ether, anisole, phenetole, amyl phenyl ether and the like, and cyclic ethers such as tetrahydrofuran, tetrahydropyran, dioxane, trioxane and the like. Of these, the cyclic ethers are preferred. The hydrocarbons used in combination with the ethers include, for example, hexane, heptane, octane, cyclohexane, methylcyclohexane, benzene, toluene, xylene and the like.

The mixing ratio of the ether and the hydrocarbon depends upon the types of solvents and an intended velocity of the hydrogenation reaction. In general, the amount of the ether in the mixed solvent is from 1 to 100 wt%, preferably from 10 to 100 wt%.

If cyclohexane is used singly for the hydrogenation reaction, a final hydrogenation rate is low, as is particularly shown in Comparative Examples 1 and 8, even when a reduced nickel catalyst is used.

Although it may occur to one that an alcohol is used as the solvent, elimination of substituents becomes considerable as is shown in Comparative Examples 3 and 10. Moreover, the use of an alcohol is disadvantageous from the industrial viewpoint in that because it considerably lowers the solubility of the polymer, a substantial amount of a solvent required to increase the solubility of the polymer has to be added in a catalystremoving step after completion of the hydrogenation reaction.

The hydrogenation reaction temperature is generally selected from a range of from room temperature to 200° C. Preferably, the temperature ranges from 80° C. to 180° C. If the reaction temperature is lower than room temperature, the hydrogenation velocity lowers to a significant extent. Over 200° C., the substituent unfavorably changes its chemical structure or is eliminated substantially.

The hydrogenation rate of the polymer is changed depending upon the purpose, and is determined by measurement of an iodine value of polymer prior to and after the hydrogenation to obtain a polymer with a predetermined hydrogenation rate.

The amount of the reduced nickel catalyst used is in arbitrarily selected from a range of from 1 to 30 parts by weight, preferably from 1 to 20 parts by weight, calculated as nickel, based on 100 parts by weight of a starting modified polymer.

Hydrogen may be used as a flow system at normal pressures or may be used under a pressure of from 1 to 300 kg/cm². The hydrogenation reaction may be effected by any procedures including those using a fixed bed, a suspension procedure and the like.

In the practice of the invention, at least 50% and ordinarily 70% of unsaturated sites of a starting modified polymer is hydrogenated.

The hydrogenation velocity is fast and the number of substituents per one molecule rarely changes as compared with that of the starting polymer.

The hydrogenated product of the modified polymer obtained according to the invention may be used as a cured product through various crosslinking agents in which the substituents present in the polymer serve as crosslinking sites. Useful crosslinking agents include epoxy compounds, metal compounds, amine compounds, organic isocyanate compounds, polyhydric alcohols, halides and the like.

The hydrogenated products of the modified polymers obtained in the invention may also be used as rubber or modifiers for plastics. For applications, additives such as thermal stabilizers, UV absorbers, pigments and lubricants may be added, if necessary, in amounts not larger than 50 wt% of the hydrogenated product. Moreover, fillers or reinforcements such as talc, mica, glass fibers and the like may be used along with the hydrogenated product for the rubber or plastic modification.

The present invention is described in detail by way of examples, which should not be construed as limiting the invention.

In the examples, the hydrogenation rate is determined by measuring an iodine value of a modified polymer and calculating the rate from the following equation.

$$\text{Hydrogenation rate (\%)} = \frac{A - B}{A} \times 100$$

wherein

A: an iodine value of a modified polymer prior to hydrogenation, and

B: an iodine value of the modified polymer after the hydrogenation.

EXAMPLE 1

100 g of polyhydroxypolyisoprene (Mn=2,600, OH value=45.3 mg/g) obtained by radical polymerization with hydrogen peroxide, 10 g of reduced nickel (amount of supported nickel 40%, carrier: diatomaceous earth) and 200 g of tetrahydrofuran used as a reaction solvent were charged into a one liter autoclave, followed by substitution of the air in the system with a purified nitrogen gas and heating to 150° C. in 30 minutes. At the time when a stationary state of 150° C. was attained, a highly pure hydrogen gas was supplied into the autoclave, after which the hydrogenation reaction was effected while keeping the inner pressure of the system at 50 kg/cm. After the reaction continued over a certain time, the resultant hydrogenated polymer was withdrawn and the catalyst was removed by filtration, followed by removal of the solvent by distillation to obtain a hydrogenated product.

The results of analysis of the thus obtained hydrogenated product are shown in Table 1.

EXAMPLE 2

50 g of polyisoprene terminated with a hydroxyl group at both ends which had been obtained by poly isoprene by the use of an anion polymerization initiator composed of a naphthalene/sodium compound and adding ethylene oxide and then water (Mn =10,000, OH value=10.5 mg/g), 3 g of reduced nickel (amount of supported nickel 40%) and 200 g of 1,4-dioxane were charged into a one liter autoclave, followed by hydrogenation reaction in the same manner as in Example 1.

The results of analysis of the resultant hydrogenated product are shown in Table 1.

EXAMPLE 3

The hydrogenation reaction was effected in the same manner as in Example 1 except that a mixed solvent made of 70 wt% of ethyl ether and 30 wt% of cyclohexane was used. The results of analysis of the resultant hydrogenated product are shown in Table 1.

EXAMPLES 4-7

The hydrogenation reaction was carried out under conditions indicated in Table 1, with the results shown in Table 1.

EXAMPLE 8

The hydrogenation reaction was effected in the same manner as in Example 1 except that the reduced nickel catalyst used was one available from Sakai Chemical Industry Co., Ltd., under the commercial name of SN-300. The results are shown in Table 1.

COMPARATIVE EXAMPLE 1

The hydrogenation reaction was effected in the same manner as in Example 1 except that 200 g of cyclohexane was used instead of tetrahydrofuran, thereby obtaining a hydrogenated product. The results of analysis of the thus obtained hydrogenated product are shown in Table 2.

From the results, it was found that a final hydrogenation rate was low when the cyclohexane was used.

COMPARATIVE EXAMPLE 2

The hydrogenation reaction was effected in the same manner as in Example 1 except that 10 g of Raney nickel was used instead of the reduced nickel, thereby obtaining a hydrogenated product. The results of analysis of the thus obtained product are shown in Table 2.

From the results, it was found that a final hydrogenation rate was low when the Raney nickel catalyst was used.

COMPARATIVE EXAMPLE 3

The hydrogenation reaction was effected in the same manner as in Example 1 except that isopropyl alcohol was used as the solvent. The results of analysis of the resultant hydrogenated product are shown in Table 2.

From the results, it was found that in the hydrogenation reaction using isopropyl alcohol as the solvent, elimination of the hydroxyl groups was considerable.

COMPARATIVE EXAMPLES 4-7

The hydrogenation reaction was effected under conditions indicated in Table 2, with the results shown in Table 2.

TABLE 1

|  | Example | | | | | | | |
|---|---|---|---|---|---|---|---|---|
|  | 1 | 2 | 3 | 4 | 5 | 6 | 7 | 8 |
| Modified Polymer: | | | | | | | | |
| polyisoprene (g) | 100 | 50 | 100 | 100 | — | — | 50 | 100 |
| polybutadiene (g) | — | — | — | — | 100 | 100 | — | — |
| number average molecular weight | 2,600 | 10,000 | 2,600 | 2,600 | 2,800 | 2,800 | 10,000 | 2,600 |
| OH value (mg/g) | 45.3 | 11.0 | 45.3 | 45.3 | 44.2 | 44.2 | 11.0 | 45.3 |
| Hydrogenation Conditions: | | | | | | | | |
| catalyst: amount (g) | 10 | 3 | 10 | 10 | 10 | 10 | 3 | 3 |
| solvent: | | | | | | | | |
| kind | THF | DOx | $Et_2$/CHx (70/30 wt %) | DOx/CHx (60/40 wt %) | THF | DOx | DOx/CHx (60/40 wt %) | THF |
| amount (g) | 200 | 200 | 200 | 200 | 200 | 200 | 200 | 200 |
| reaction temp. (°C.) | 150 | 150 | 150 | 150 | 150 | 150 | 150 | 150 |
| pressure of hydrogen (kg/cm² G) | 50 | 50 | 50 | 50 | 50 | 50 | 50 | 50 |
| time (Hrs.) | 6 | 6 | 6 | 6 | 6 | 6 | 6 | 6 |
| Hydrogenated Polymer: | | | | | | | | |
| hydrogenation rate (%) | 96 | 99 | 94 | 98 | 97 | 94 | 93 | 97 |
| OH value (mg/g) | 45.1 | 10.6 | 45.2 | 45.1 | 44.0 | 43.9 | 10.7 | 45.0 |

In the "kind of solvent", THF: tetrahydrofuran, DOx: 1,4-dioxane, $Et_2O$: ethyl ether, and CHx: cyclohexane.

TABLE 2

|  | Comparative Example | | | | | | |
|---|---|---|---|---|---|---|---|
|  | 1 | 2 | 3 | 4 | 5 | 6 | 7 |
| Modified Polymer: | | | | | | | |
| polyisoprene (g) | 100 | 100 | 100 | 100 | 50 | — | 100 |
| polybutadiene (g) | — | — | — | — | — | 100 | — |
| number average molecular weight | 2,600 | 2,600 | 2,600 | 2,600 | 10,000 | 2,800 | 2,600 |
| OH value (mg/g) | 45.3 | 45.3 | 45.3 | 45.3 | 11.0 | 44.2 | 45.3 |
| Hydrogenation Conditions: | | | | | | | |
| catalyst: | | | | | | | |
| type (1) | A | B | A | A | B | A | C |
| amount (g) | 10 | 10 | 10 | 10 | 3 | 10 | 3 |
| solvent: | | | | | | | |
| kind (2) | CHx | THF | IPA | IPA/CHx (70/30 wt %) | THF | CHx | THF |
| amount (g) | 200 | 200 | 200 | 200 | 200 | 200 | 200 |
| reaction temp. (°C.) | 150 | 150 | 150 | 150 | 150 | 150 | 150 |
| pressure of hydrogen (kg/cm² G) | 50 | 50 | 50 | 50 | 50 | 50 | 50 |
| time (Hrs.) | 6 | 6 | 6 | 6 | 6 | 6 | 6 |
| Hydrogenated Polymer: | | | | | | | |
| hydrogenation rate (%) | 42 | 46 | 87 | 53 | 42 | 45 | 89 |

TABLE 2-continued

| | Comparative Example | | | | | | |
|---|---|---|---|---|---|---|---|
| | 1 | 2 | 3 | 4 | 5 | 6 | 7 |
| OH value (mg/g) | 44.1 | 41.3 | 18.3 | 21.2 | 10.5 | 43.2 | 22.0 |

(1) In the "kind of catalyst", A: reduced nickel, B: Raney nickel, C: 5% palladium-on-carbon catalyst.
(2) In the "kind of solvent", THF: tetrahydrofuran, DOx: 1,4-dioxane, Et$_2$O: ethyl ether, CHx: cyclohexane, and IPA: isopropyl alcohol.

EXAMPLE 9

Polyisoprene having a number average molecular weight of 31,000 when determined by GPC was obtained by anion polymerization using n-butyllithium as a catalyst. 100 g of the polymer and 9.8 g of maleic anhydride (MAn) were agitated at 180° C. in a stream of nitrogen for 10 hours to effect the addition reaction, thereby obtaining a maleic anhydride adduct of the polyisoprene. The amount of the added MAn was determined by measurement of an acid value, from which it was confirmed that 9 wt% of the MAn was added.

100 g of the maleic anhydride adduct of the polyisoprene, 10 g of reduced nickel (amount of supported nickel 40%, carrier: diatomaceous earth), and 200 g of tetrahydrofuran as a reaction solvent were charged into a one liter autoclave, followed by substitution of the system with a purified nitrogen gas and heating to 150° C. in 30 minutes. At the time when a stationary state of 150° C. was attained, a highly pure hydrogen gas was supplied to the autoclave and the hydrogenation reaction was effected for 6 hours while keeping the inner pressure of the system at 100 kg/cm$^2$. After allowing to cool, the reaction solution was withdrawn, from which the catalyst was removed by filtration, followed by drying in vacuum to obtain a hydrogenated product of the maleic anhydride-containing polyisoprene. The hydrogenation rate of the hydrogenated product was found to be 89%. The measurement of the acid value revealed that elimination of the MAn from the polymer by the hydrogenation reaction did not occur.

EXAMPLE 10

Polyisoprene having a carboxyl group at both ends and a number average molecular weight of 11,000 when determined by GPC was obtained by radical polymerization using 4,4'-azobis(4-cyanopentanoic acid) having a carboxyl group at both ends. The measurement of an acid value of the polyisoprene revealed that the acid value was 10.1 mg/g.

Subsequently, the general procedure of Example 9 was repeated except that 100 g of polyisoprene terminated with a carboxyl group at both ends, 10 g of reduced nickel (amount of supported nickel 40%, carrier: diatomaceous earth) and 200 g of 1,4-dioxane were used, thereby obtaining a hydrogenated product of the polyisoprene terminated with a carboxyl group at both ends. The hydrogenation rate was 96% and the acid value of the hydrogenated product was 9.6 mg/g.

EXAMPLE 11

A hydrogenated product of maleic anhydride-containing polyisoprene was obtained in the same manner as in Example 9 except that 200 g of 1,4-dioxane was used as a reaction solvent for the hydrogenation reaction. The hydrogenation rate was 92% and the amount of the addition of the MAn was 8.8 wt%.

EXAMPLE 12

A hydrogenated product of maleic anhydride-containing polyisoprene was obtained in the same manner as in Example 9 except that a mixed solvent of 120 g of 1,4-dioxane and 80 g of cyclohexane was used as a reaction solvent for the hydrogenation reaction. The hydrogenation rate was 87% and the amount of the addition of the MAn was 8.5 wt%.

EXAMPLE 13

Polyisoprene having a number average molecular weight of 69,000 when determined by GPC was obtained by anion polymerization using n-butyllithium as a catalyst. 100 g of the polymer and 17.5 g of N-phenylmaleimide (PMI) were agitated at 180° C. in a stream of nitrogen for 15 hours to effect the addition reaction, thereby obtaining an N-phenylmaleimide adduct of the polyisoprene. The amount of the added MAn was measured by the Kjaldahl method, from which it was confirmed that 15 wt% of the PMI was added.

The hydrogenation reaction was effected in the same manner as in Example 9 except that 100 g of the N-phenylmaleimide adduct of the polyisoprene was used, thereby obtaining a hydrogenated product of the N-phenylmaleimide-containing polyisoprene. The hydrogenated product had a hydrogenation rate of 92%. It was confirmed by the Kjaldahl method that any elimination of the PMI from the polymer by the hydrogenation reaction did not occur. The hydrogenation rate of the hydrogenated product was found to be 89%. The measurement of the acid value revealed that elimination of the MAn from the polymer by the hydrogenation reaction did not occur.

EXAMPLE 14

A hydrogenated product of the N-phenylmaleimide-containing polyisoprene was obtained in the same manner as in Example 13 except that 200 g of 1,4-dioxane was used as a reaction solvent for the hydrogenation reaction. The hydrogenation rate was 98% and the amount of the addition of the PMI was 14.1 wt%.

EXAMPLE 15

A hydrogenated product of the N-phenylmaleimide-containing polyisoprene was obtained in the same manner as in Example 13 except that a mixed solvent of 140 g of 1,4-dioxane and 60 g of cyclohexane was used as a reaction solvent of the hydrogenation reaction. The hydrogenation rate was 91% and the amount of the addition of the PMI was 14.9 wt%.

COMPARATIVE EXAMPLE 8

The hydrogenation reaction was effected in the same manner as in Example 9 except that 200 g of cyclohexane was used, instead of the tetrahydrofuran, as a reaction solvent for the hydrogenation reaction. The resultant polymer had a hydrogenation rate of 29% and an amount of the addition of the MAn of 8.2 wt%.

The above results revealed that a final hydrogenation rate was low when using the cyclohexane.

COMPARATIVE EXAMPLE 9

The hydrogenation reaction was effected in the same manner as in Example 9 except that 10 g of Raney nickel was used instead of the reduced nickel catalyst. The resultant polymer had a hydrogenation rate of 12% and an amount of the addition of the MAn of 8.0 wt%.

From the above results, it was found that the final hydrogenation rate was low for the Raney nickel catalyst.

COMPARATIVE EXAMPLE 10

The hydrogenation reaction was effected in the same manner as in Example 13 except that isopropyl alcohol was used instead of the tetrahydrofuran as a reaction solvent of the hydrogenation reaction. The resultant polymer had a hydrogenation rate of 76% and an amount of the addition of the PMI of 9 wt%.

From the above results, it was found that with the isopropyl alcohol, elimination of the PMI from the polymer was considerable.

COMPARATIVE EXAMPLE 11

The hydrogenation reaction was effected in the same manner as in Example 13 using 2 g of a palladium (5 wt%)-on-carbon catalyst instead of the reduced nickel as a catalyst. The resultant polymer had a hydrogenation rate of 23% and an amount of the addition of the PMI of 12 wt%.

From the above results, it was found that with the palladium-carbon catalyst, the final hydrogenation rate was low and elimination of the PMI from the polymer was considerable.

What is claimed is:

1. A process for the hydrogenation of at least 50% of the carbon to carbon double bonds of a conjugated diene homopolymer or copolymer having alcoholic hydroxyl groups as substituents while retaining the hydroxyl groups characterized in that reduced nickel is used as a catalyst for the hydrogenation and an ether or a mixture of an ether and a hydrocarbon is used as a solvent during the course of the hydrogenation.

2. A process according to claim 1, wherein said conjugated diene polymer is a homopolymer of a conjugated diene monomer, a copolymer of at least two conjugated diene monomers, or a copolymer of a conjugated diene monomer and a vinyl monomer.

3. A process according to claim 2, wherein said conjugated diene polymer is polyisoprene.

4. A process according to claim 1, wherein said solvent is a cyclic ether.

5. A process according to claim 4, wherein said cyclic ether is tetrahydrofuran or diozane.

6. A process according to claim 1, wherein the conjugated diene polymer molecules have the alcoholic hydroxyl substituents at the ends of the polymer molecules.

* * * * *